(12) United States Patent
Zhang et al.

(10) Patent No.: US 10,819,509 B2
(45) Date of Patent: Oct. 27, 2020

(54) ASYMMETRIC KEY MANAGEMENT IN CONSORTIUM BLOCKCHAIN NETWORKS

(71) Applicant: Alibaba Group Holding Limited, George Town (KY)

(72) Inventors: Yixiang Zhang, Hangzhou (CN); Shubo Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,253

(22) Filed: Apr. 22, 2019

(65) Prior Publication Data
US 2019/0253245 A1 Aug. 15, 2019

Related U.S. Application Data

(63) Continuation of application No. PCT/CN2018/117576, filed on Nov. 27, 2018.

(51) Int. Cl.
*H04L 29/06* (2006.01)
*H04L 9/08* (2006.01)
(Continued)

(52) U.S. Cl.
CPC ............ *H04L 9/0825* (2013.01); *G06F 21/00* (2013.01); *G06F 21/602* (2013.01);
(Continued)

(58) Field of Classification Search
None
See application file for complete search history.

(56) References Cited

U.S. PATENT DOCUMENTS 10,299,128 B1 * 5/2019 Suthar ........................ H04L 9/30
10,361,853 B2 * 7/2019 Castagna .............. H04L 9/3247
(Continued)

FOREIGN PATENT DOCUMENTS

CN 107395349 11/2017
CN 108305072 7/2018
(Continued)

OTHER PUBLICATIONS

Davenport, Amanda et al. Attack Surface Analysis of Permissioned Blockchain Platforms for Smart Cities. 2018 IEEE International Smart Cities Conference (ISC2). https://ieeexplore.ieee.org/stamp/stamp.jsp?tp=&arnumber=8656983 (Year: 2018).*
(Continued)

*Primary Examiner* — Jeremiah L Avery
(74) *Attorney, Agent, or Firm* — Fish & Richardson P.C.

(57) ABSTRACT

Implementations of the present specification provide for management of service keys for consortium blockchain networks within a blockchain-as-a-service (BaaS) platform. Implementations include actions of receiving a request for a service key from a participant in a consortium blockchain network provisioned within the BaaS platform, determining that the participant is authorized for the service key based on a service authorization table that records participant privileges within the consortium blockchain network, providing a key package including an encrypted private key of the service key, and a public key of the service key, and sending the key package to the participant, the participant decrypting the private key of the service key using a public key associated with the participant.

20 Claims, 5 Drawing Sheets

(51) Int. Cl.
  *G06F 21/00* (2013.01)
  *G06F 21/60* (2013.01)
  *H04L 9/32* (2006.01)
  *H04L 9/06* (2006.01)
  *H04L 9/14* (2006.01)
  *H04L 9/30* (2006.01)

(52) U.S. Cl.
  CPC .............. *H04L 9/0637* (2013.01); *H04L 9/14* (2013.01); *H04L 9/30* (2013.01); *H04L 9/3239* (2013.01); *H04L 9/3268* (2013.01); *H04L 2209/38* (2013.01)

(56) References Cited

U.S. PATENT DOCUMENTS

| | | | |
|---|---|---|---|
| 2008/0101615 | A1 | 5/2008 | Stransky et al. |
| 2017/0005804 | A1* | 1/2017 | Zinder ............... H04L 9/3247 |
| 2017/0337534 | A1* | 11/2017 | Goeringer ............. H04L 9/3239 |
| 2017/0353309 | A1* | 12/2017 | Gray ................... G06F 21/51 |
| 2018/0032383 | A1 | 2/2018 | Surcouf |
| 2018/0048461 | A1* | 2/2018 | Jutla ................... H04L 9/3236 |
| 2018/0130050 | A1* | 5/2018 | Taylor ................. G06Q 20/3674 |
| 2018/0157825 | A1* | 6/2018 | Eksten .................. G06F 21/64 |
| 2018/0176228 | A1 | 6/2018 | He et al. |
| 2018/0191714 | A1* | 7/2018 | Jentzsch .............. H04L 63/101 |
| 2018/0268152 | A1* | 9/2018 | Cuomo ................ H04L 9/3236 |
| 2018/0287780 | A1* | 10/2018 | Safford ................. G06F 21/51 |
| 2019/0013934 | A1* | 1/2019 | Mercuri ................ H04L 9/0637 |
| 2019/0036906 | A1* | 1/2019 | Biyani ................. H04L 63/0807 |
| 2019/0042620 | A1* | 2/2019 | Garagiola ............ H04L 9/0637 |
| 2019/0114182 | A1* | 4/2019 | Chalakudi ............ H04L 9/0618 |
| 2020/0084018 | A1* | 3/2020 | Pande ................. H04L 9/0637 |

FOREIGN PATENT DOCUMENTS

| | | |
|---|---|---|
| CN | 108600182 | 9/2018 |
| CN | 108737435 | 11/2018 |
| JP | 2008516551 | 5/2008 |
| RU | 182969 | 9/2018 |
| WO | WO 2006041590 | 4/2006 |
| WO | WO 2006084522 | 8/2006 |
| WO | WO 2017127238 | 7/2017 |
| WO | WO 2018019364 | 2/2018 |
| WO | WO 2018095275 | 5/2018 |
| WO | WO 2018148067 | 8/2018 |

OTHER PUBLICATIONS

Nayak, Sambit et al. Saranyu: Using Smart Contracts and Blockchain for Cloud Tenant Management. 2018 IEEE 11th International Conference on Cloud Computing (CLOUD). https://ieeexplore.ieee.org/stamp/stamp.jsp?tp=&arnumber=8457889 (Year: 2018).*

Kfoury, Elie; Khoury, David. Distributed Public Key Infrastructure and PSK Exchange Based on Blockchain Technology. 2018 IEEE International Conference on Internet of Things, Green Computing and Communications. https://ieeexplore.ieee.org/stamp/stamp.jsp?tp=&arnumber=8726475 (Year: 2018).*

Wright, Craig; Serguieva, Antoaneta. Sustainable Blockchain-Enabled Services: Smart Contracts. 2017 IEEE International Conference on Big Data (Big Data). https://ieeexplore.ieee.org/stamp/stamp.jsp?tp=&arnumber=8258452 (Year: 2017).*

Wang, Rong et al. A Privacy-Aware PKI System Based on Permissioned Blockchains. 2018 IEEE 9th International Conference on Software Engineering and Service Science (ICSESS). https://ieeexplore.ieee.org/stamp/stamp.jsp?tp=&arnumber=8663738 (Year: 2018).*

Kiyomoto, Shinsaku et al. On blockchain-based authorization architecture for beyond-5G mobile services. 2017 12th International Conference for Internet Technology and Secured Transactions (ICITST). https://ieeexplore.ieee.org/stamp/stamp.jsp?tp=&arnumber=8356363 (Year: 2017).*

Kfoury, Elie; Kfoury, David. Distributed Public Key Infrastructure and PSK Exchange Based on Blockchain Technology. 2018 IEEE Confs on Internet of Things, Green Computing and Communications. https://ieeexplore.ieee.org/stamp/stamp.jsp?tp=&arnumber=8726475 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/117576, dated Sep. 2, 2019, 8 pages.

Arredondo, "Blockchain and Certificate Authority Cryptography for an Asynchronous On-Line Public Notary System," The University of Texas at Austin, Dec. 2017, 119 pages.

Dib et al., "Consortium Blockchains: Overview, Applications and Challenges," International Journal on Advances in Telecommunication, Sep. 2019, 11(1): 51-64.

Lei, et al., "Blockchain-Based Dynamic Key Management for Heterogeneous Intelligent Transportation Systems," IEEE Internet of Things Journal, Dec. 2017, 4(6):1832-1843.

Extended European Search Report in Application No. 18865356.2, dated Aug. 7, 2020, 11 pages.

* cited by examiner

ASYMMETRIC KEY MANAGEMENT IN CONSORTIUM BLOCKCHAIN NETWORKS

CROSS-REFERENCE TO RELATED APPLICATIONS

This application is a continuation of PCT Application No. PCT/CN2018/117576, filed on Nov. 27, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

A consortium blockchain network can be described as lightly centralized, or multi-centered, each node of the consortium blockchain network being operated by participants in the consortium. That is, the participants join a blockchain network to form a consortium, which has the same service request, and every node maintains the blockchain operation. In consortium blockchain network, the consortium blockchain builds the foundation of trust for authorized consortium participants. Unlike a public blockchain network, in which all transaction information is stored in a public blockchain in plaintext, data in the consortium blockchain network is encrypted, and is stored as ciphertext on the consortium blockchain. Consequently, consortium blockchain networks require key management functionality to enable privacy isolation, and sharing in a consortium blockchain network.

SUMMARY

Implementations of the present specification include computer-implemented methods for management of encryption keys in blockchain networks. More particularly, implementations of the present specification are directed to management of asymmetric encryption keys in consortium blockchain networks.

Implementations of the present specification provide for management of service keys for consortium blockchain networks within a blockchain-as-a-service (BaaS) platform. In some implementations, actions include receiving a request for a service key from a participant in a consortium blockchain network provisioned within the BaaS platform, determining that the participant is authorized for the service key based on a service authorization table that records participant privileges within the consortium blockchain network, providing a key package including an encrypted private key of the service key, and a public key of the service key, and sending the key package to the participant, the participant decrypting the private key of the service key using a public key associated with the participant. Other implementations include corresponding systems, apparatus, and computer programs, configured to perform the actions of the methods, encoded on computer storage devices.

These and other implementations may each optionally include one or more of the following features: actions further include, prior to receiving the request for the service key from the participant, receiving an identity certificate from the participant; the identity certificate is received as an encrypted identity certificate, and the BaaS platform decrypts the identity certificate using a public key of the participant; actions further include encrypting the private key of the service key using a public key associated with the participant; the service key is generated using a key derivation function (KDF) key tree in response to determining that the participant is authorized for the service key; the service key is absent from the BaaS platform after sending the key package to the participant; and the participant uses the private key of the service key to encrypt transactions with one or more other participants within the consortium blockchain network.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

Like reference symbols in the various drawings indicate like elements.

DETAILED DESCRIPTION

Figure 1:
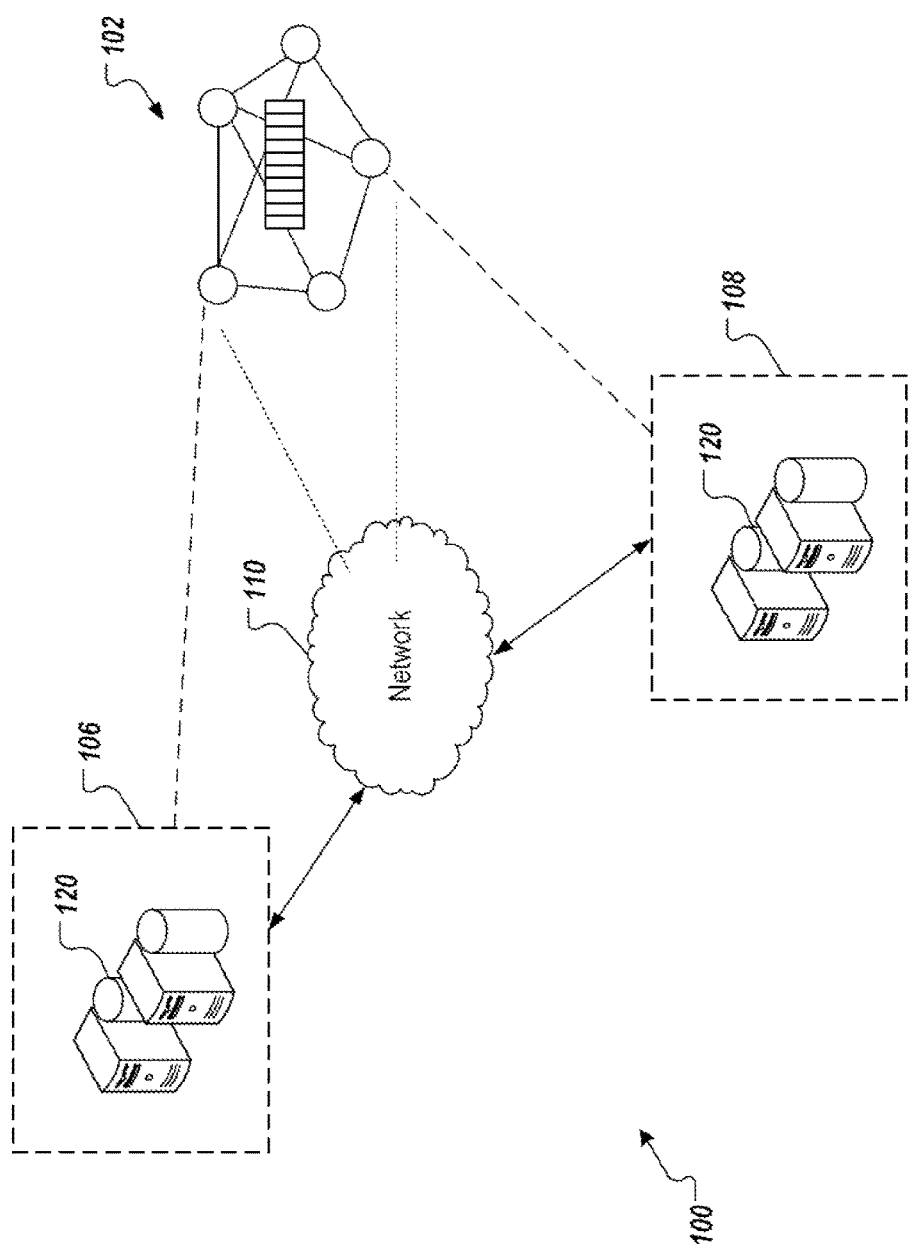
FIG. 1 depicts an example environment that can be used to execute implementations of the present specification.

Implementations of the present specification include computer-implemented methods for management of encryption keys in blockchain networks. More particularly, implementations of the present specification are directed to management of service keys provided as asymmetric encryption keys in consortium blockchain networks.

Implementations of the present specification provide for management of service keys for consortium blockchain networks within a blockchain-as-a-service (BaaS) platform. In some implementations, actions include receiving a request for a service key from a participant in a consortium blockchain network provisioned within the BaaS platform, determining that the participant is authorized for the service key based on a service authorization table that records participant privileges within the consortium blockchain network, providing a key package including an encrypted private key of the service key, and a public key of the service key, and sending the key package to the participant, the participant decrypting the private key of the service key using a public key associated with the participant.

To provide further context for implementations of the present specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associate with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present specification are described in further detail herein with reference to a consortium blockchain network, which is partially-public among the participating entities. It is contemplated, however, that implementations of the present specification can be realized in any appropriate type of blockchain network.

To provide context for implementations of the present specification, and as introduced above, a consortium blockchain network can be considered lightly-centralized, or multi-centered, because each node of the consortium blockchain network is operated by a participant in the consortium. For example, participants (e.g., enterprises) form a consortium that participates in the consortium blockchain network, in which the same type(s) of service requests are used, and every node maintains operation of the blockchain. In the consortium blockchain network, the blockchain builds the foundation of trust for authorized consortium participants. This is in contrast to a public blockchain network, for example, in which all transaction information is stored in a public blockchain in plaintext, and is transparent to all participants. In the consortium blockchain network, the data is encrypted as ciphertext, and is stored on the blockchain.

Accordingly, consortium blockchain networks utilize key management functionality to enable privacy isolation (e.g., isolating data from other participants in the consortium blockchain network), and sharing between participants. That is, to enable encryption within the consortium blockchain network, encryption keys are used by participants. For example, each participant has a private key, public key pair (private-public key pair), which are used to encrypt/decrypt data, and to verify transactions. For example, a participant's public key can be used to verify that data of a transaction originated with the participant. In view of this, key management functionality is implemented within the consortium blockchain network to ensure privacy isolation, and sharing within the consortium blockchain network.

In some implementations, encryption key pairs used for encrypting transactions within the consortium blockchain network can be referred to as service keys (i.e., private-public key pair). In some examples, service keys are derived in units of service types. Each service key has a different participant, and a participant can have multiple service keys within the consortium blockchain network. For example, service keys can correspond to transactions between participants within the consortium blockchain network. By way of non-limiting example, a first participant and a second participant can have respective service keys that enable private transactions to be conducted between the first participant and the second participant within the consortium blockchain network. The first participant and a third participant can have respective service keys that enable private transactions to be conducted between the first participant and the third participant within the consortium blockchain network. In this example, the first participant has a set of service keys, one for transactions with the second participant, and another for transaction with the third participant.

To provide further context, enterprises can provide blockchain networks on behalf of users. For example, enterprises can provide blockchain-as-a-service (BaaS) models, through which multiple, different blockchain networks can be established. By way of non-limiting example, an enterprise can provide a BaaS platform, and a first consortium of participants can participate in a first consortium blockchain network within the BaaS platform, and a second consortium of participants can participate in a second consortium blockchain network within the BaaS platform. In general, the enterprise operating the BaaS platform provides infrastructure, and administrative services, among many other services.

Each participant in a consortium blockchain network hosted on the BaaS platform provides proof of identity to the BaaS platform. For example, each participant provides an identity certificate to the BaaS platform. In some examples, identity certificates enable communication using a security protocol. Example security protocols include, without limitation, transport layer security (TLS), and secure sockets layer (SSL). For example, OpenSSL can be used to generate an identity certificate (SSL certificate) for secure communications between the participant, and the BaaS platform (e.g., a BaaS server). The BaaS platform uses the identity certificate to confirm the identity of the source of the communication.

In provisioning a consortium blockchain network, the BaaS platform needs to ensure that the administrators, and participants of each consortium blockchain network can configure, and obtain service keys simply and securely. Multiple key distribution techniques can be used for the administrator to convey keys to participants. Example key distribution techniques can include, without limitation, Diffie-Hellman key exchange, and offline key distribution. Diffie-Hellman key exchange is a cryptographic technique that implements key exchange in an untrusted channel environment. Offline key distribution key detaches the consortium blockchain network by sending keys to designated recipients by mail, or other channels.

While traditional key distribution techniques are effective for the transmission of single keys, such techniques are not desirable in the case of multiple service keys in a consortium blockchain network. This is particularly the case, because each service key can have different participant combinations. Further, in traditional techniques, the service keys need to be stored in a centralized database, which increases the overall system risk. Also, traditional key distribution techniques are highly dependent on channel security. If key distribution is performed in a public environment, for example, it is easy to leak the keys, and expose the system to risk.

In view of the above context, implementations of the present specification are directed to management of asymmetric encryption keys (service keys) in consortium blockchain networks. In some implementations, and as described in further detail herein, a BaaS platform derives service keys using asymmetric key derivation technology. However, the BaaS platform does not save the service keys. In accordance with implementations of the present specification, the administrator of the consortium blockchain network can authorize the participants according to different service keys through the BaaS platform. In some implementations, the service key is encrypted using the public key contained in the identity certificate of the respective participant (e.g., the identity certificate of the participant in the consortium blockchain network uploaded to the BaaS platform). In this manner, it is ensured that only the designated participant can decrypt the private key of the service key (as noted above, the service key is provided as a private-public key pair).

FIG. 1 depicts an example environment 100 that can be used to execute implementations of the present specification. In some examples, the example environment 100 enables entities to participate in a consortium blockchain network 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
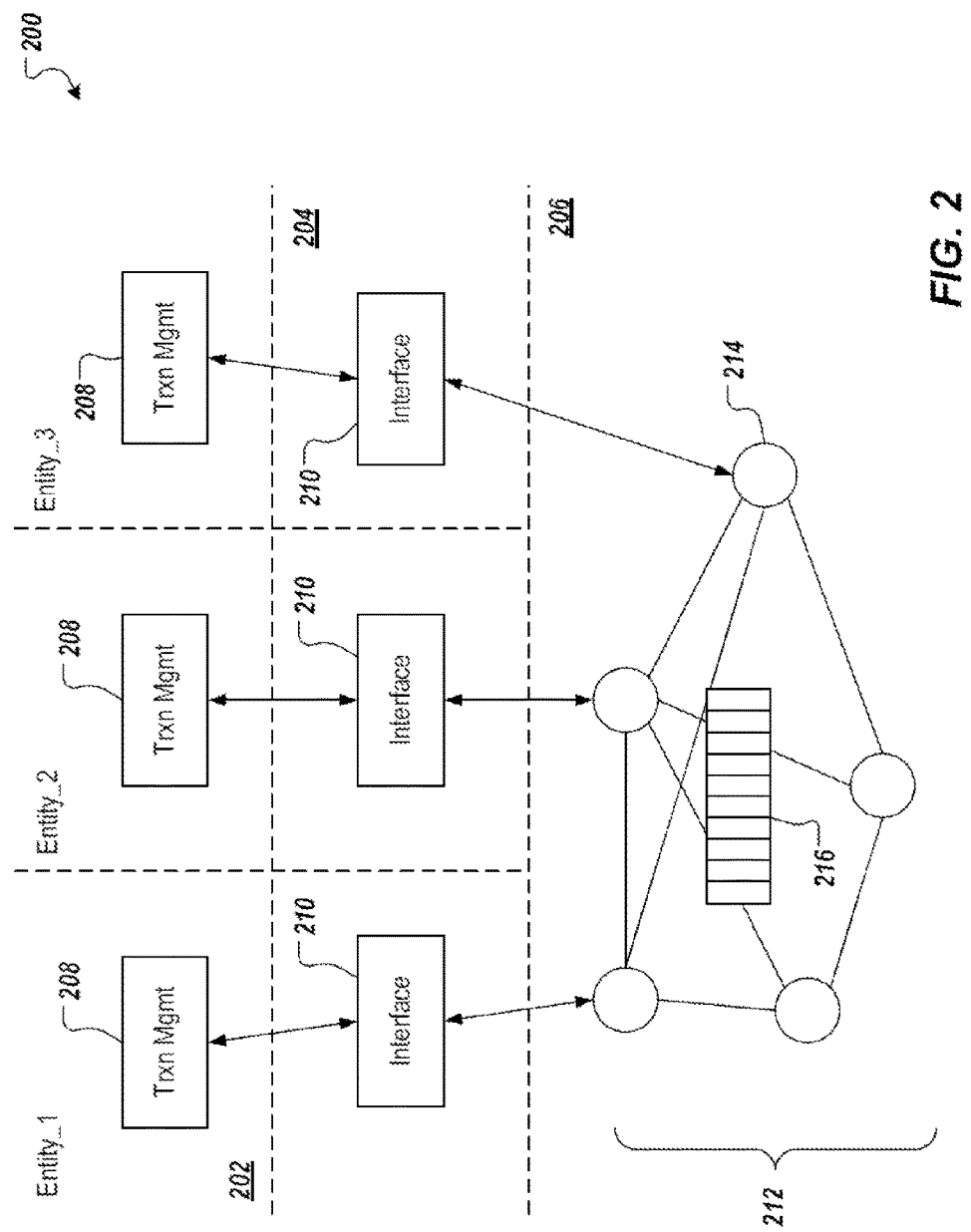
FIG. 2 depicts an example conceptual architecture in accordance with implementations of the present specification.

FIG. 2 depicts an example conceptual architecture 200 in accordance with implementations of the present specification. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

As introduced above, implementations of the present specification are directed to management of asymmetric encryption keys in consortium blockchain networks. In some implementations, a key derivation function (KDF) key tree is used by an administrator to generate service keys for participants in a consortium blockchain network. As described herein, the administrator does not save the service keys. Instead, the administrator maintains a data table that defines each participants' access to respective service keys. Continuing with the example above, a consortium blockchain network can enable private transactions to be conducted between a first participant and a second participant, and the first participant and a third participant. Accordingly, and in this example, the data table indicates that the first participant has access privileges for transactions with the second participant, and the third participant, that the second participant has access privileges for transactions with the first participant, and that the third participant has access privileges for transactions with the first participant.

When a participant sends a request for a service key (e.g., to the BaaS platform), access rights of the participant are verified based on the data table, the service key is created by the BaaS platform, and is provided to the participant. Continuing with the example above, the first participant can request a service key for secure transactions with the second participant. The BaaS platform can reference the data table to determine that the first participant has access rights for secure transactions with the second participant, and in response, can generate the service key (private-public key pair), encrypt at least a portion of the service key (e.g., encrypt the private key), and send the service key to the first participant. The service key, however, is not stored on the BaaS platform.

As described herein, implementations of the present specification combine encryption of the service key with the identity certificate of the consortium blockchain network participant on the BaaS platform. In this manner, the service key is encrypted using the public key associated with the identity certificate, and only the participant can decrypt (using the private key used for the identity certificate), and obtain the unencrypted service key.

In further detail, the identity certificate of a participant i is associated with a private (secret) key ($SK_{ID\_i}$), and a public key ($PK_{ID\_i}$). The participant stores the private key ($SK_{ID\_i}$), and it is not shared. The public key ($PK_{ID\_i}$) is shared with the BaaS platform. The service key generated by the BaaS platform for the participant i includes a private key ($SK_{SK\_i}$), and a public key ($PK_{SK\_i}$). In accordance with implementations of the present specification, the BaaS platform creates a service key package (data bundle) that is sent to the participant. In some examples, the BaaS platform encrypts the private key of the service key using the participant's public key (e.g., $PK_{ID\_i}(SK_{SK\_i})$), and provides the key package as the public key of the service key, and the encrypted private key of the service key (e.g., [$PK_{SK\_i}$, $PK_{ID\_i}(SK_{SK\_i})$]). The participant receives the key package, and decrypts the private key ($SK_{SK\_i}$) using the private key ($SK_{ID\_i}$). In this manner, the participant obtains the service key for conducting transactions within the consortium blockchain network.

Figure 3A:
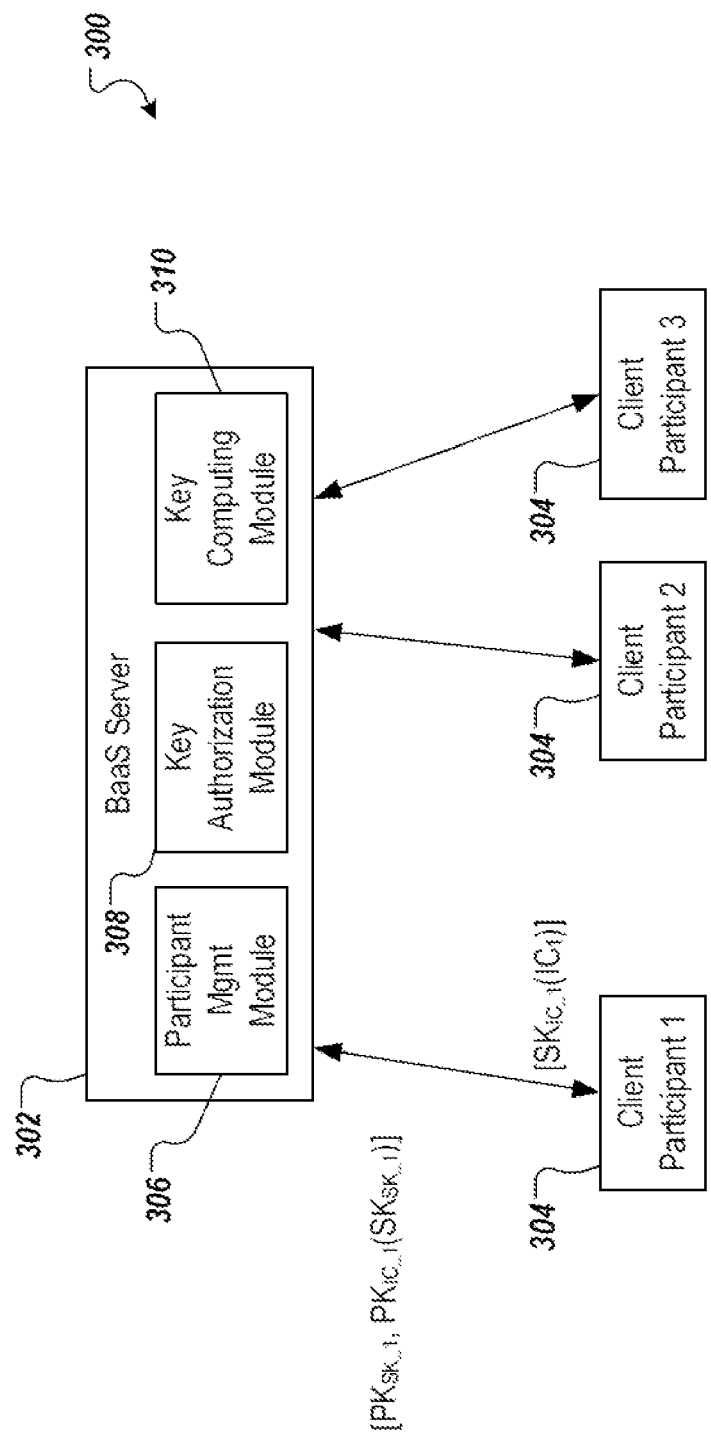
FIG. 3A depicts an example module architecture in accordance with implementations of the present specification.

FIG. 3A depicts an example architecture 300 accordance with implementations of the present specification. the example architecture 300 includes a BaaS server 302, and clients 304. The clients 304 are each associated with a respective participant in a consortium blockchain network provided within a BaaS platform.

In some implementations, the BaaS server 302 includes a participant management module 306, a key authorization module 308, and a key computing module 310.

In some examples, the participant management module 306 manages the participants in each consortium blockchain network provisioned within the BaaS platform. For example, the participant management module 306 stores identity certificates, and corresponding public keys for each participant in a consortium blockchain network. In some examples, the key authorization module 308 processes requests for service keys from participants to determine whether participants are authorized for service keys requested. In some examples, the key computing module 310 generates service keys using the KDF key tree for respective participants.

For purposes of illustration, an example service key request from a client 304 (Client A) will be described with reference to FIGS. 3A and 3B.

Figure 3B:
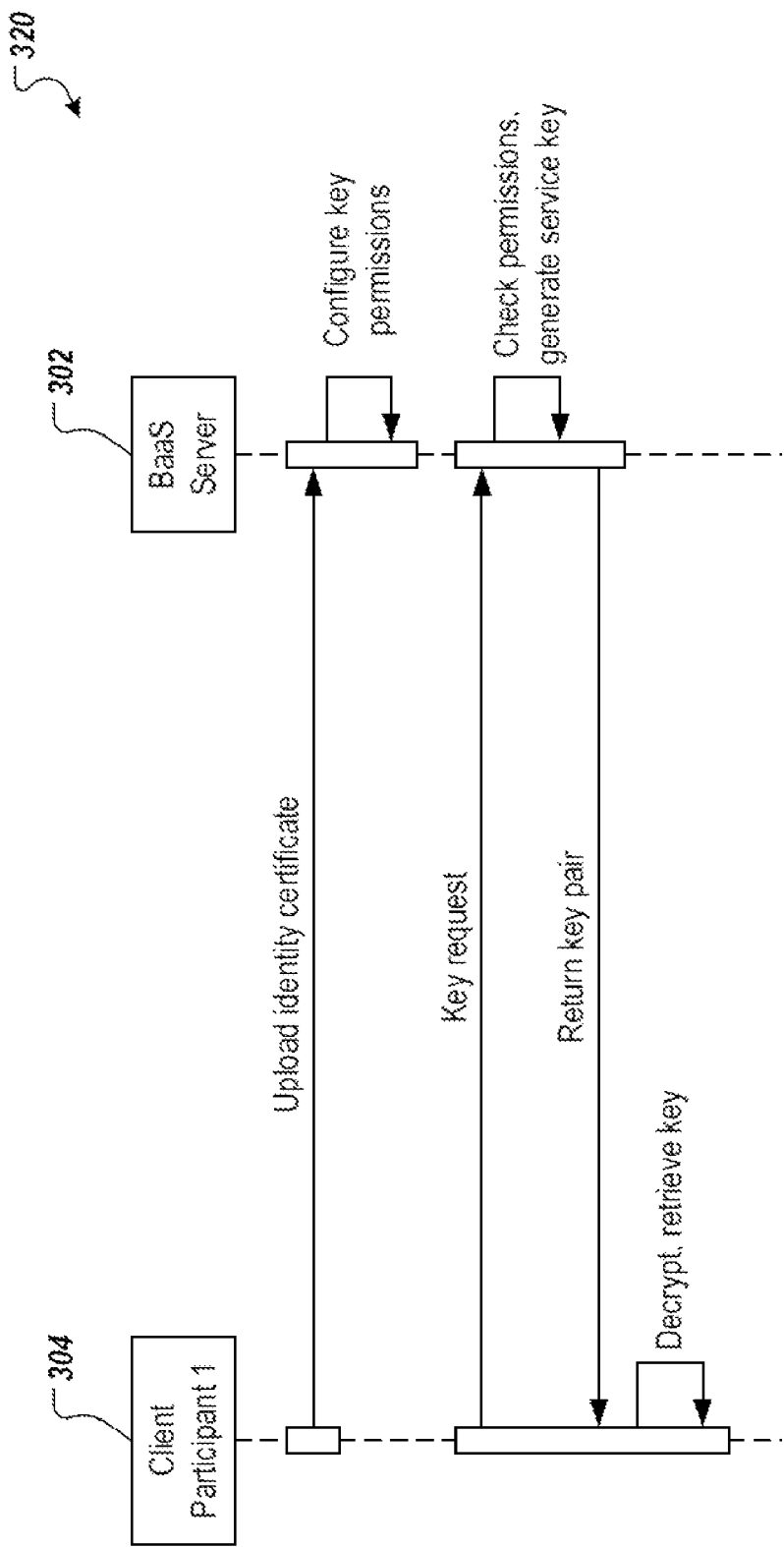
FIG. 3B depicts an example flow diagram in accordance with implementations of the present specification.

FIG. 3B depicts an example flow diagram 320 in accordance with implementations of the present specification. The example flow diagram 320 includes the client 304 (first participant (Participant 1)), and the BaaS server 302. The client 304 is operated by, or on behalf of a first participant in a consortium blockchain network provided by a BaaS platform. The BaaS server 302 provides administrative functionality within the BaaS platform, as described herein.

In some implementations, and as described herein, multiple participants engage the BaaS platform to establish a consortium blockchain network within the BaaS platform including the participant associated with the client 304. As part of establishing the consortium blockchain network, the participants receive invitations from the administrator (e.g., from the BaaS server 302) to upload respective identity certificates to the BaaS platform.

In the example of FIGS. 3A and 3B, the client 304 encrypts its identity certificate using its public key, and uploads the encrypted identity certificate (e.g., [$SK_{IC\_1}(IC_1)$]) to the BaaS server 302. The BaaS server 302 decrypts the identity certificate using the respective public key ($PK_{IC\_1}$), and confirms the identity of the participant. The BaaS server 302 configures service key permissions (access privileges) in the consortium blockchain network. For example, and continuing with the example above, the BaaS platform 302 can record in a data table that the first participant is allowed to conduct private transactions with each of the second participant, and the third participant, respectively.

The client 304 sends a service key request to the BaaS server 302. In the depicted example, the client 304 sends a service key request for a service key to encrypt transactions between the first participant, and the second participant (e.g., $REQ_{1\text{-}2}$). In response to the request, the BaaS server 302 checks the access rights of the first participant (e.g., using the data table), and confirms that the first participant is authorized for private transactions with the second participant. In response, the BaaS server 302 calculates the corresponding service key using the KDF key tree.

The BaaS server 302 provides a key package to transmit the service key to the client 304. As described herein, the BaaS server 302 uses the first participant's public key associated with the identity certificate (e.g., $PK_{IC\_1}$) to encrypt the private key of the service key (e.g., $PK_{IC\_1}(SK_{SK\_1})$). The key package includes the public key of the service key, and the encrypted private key of the service key (e.g., $[PK_{SK\_1}, PK_{IC\_1}(SK_{SK\_1})]$). The BaaS server 302 sends the data package to the client 304. The client 304 decrypts the encrypted private key of the service key using the private key associated with the first participant's identity certificate (e.g., $SK_{IC\_1}$).

At least a portion of the example flow diagram 320 is repeated, each time the first participant requires a new service key. For example, to conduct transactions with the third participant, the first participant sends another service key request for a service key to encrypt transactions between the first participant, and the second participant (e.g., $REQ_{1\_3}$). In response, the BaaS service 302 can provide another service key to the first participant to enable the first participant to securely communicate with the third participant within the consortium blockchain network. Consequently, the first participant maintains at least two sets of service keys (e.g., the service key for transactions with the second participant, and the service key for transactions with the third participant), while the BaaS platform stores no service keys.

Figure 4:
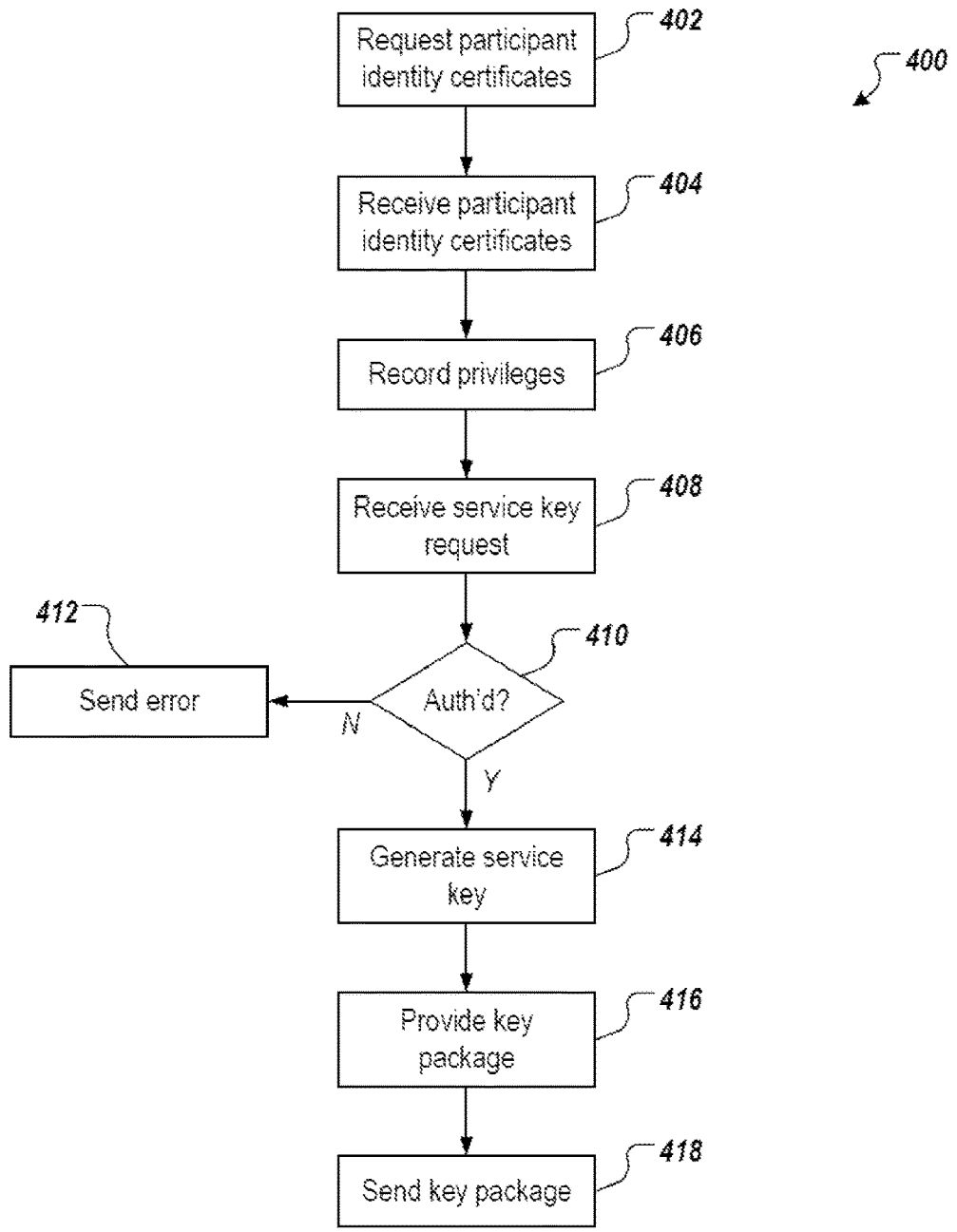
FIG. 4 depicts an example process that can be executed in accordance with implementations of the present specification.

FIG. 4 depicts an example process 400 that can be executed in accordance with implementations of the present specification. In some implementations, the example process 400 may be performed using one or more computer-executable programs executed using one or more computing devices.

Participant identity certificates are requested (402). For example, as part of establishing a consortium blockchain network within a BaaS platform, a BaaS server sends identity certificates requests to each participant of the consortium blockchain network. Participant identity certificates are received (404). For example, in response to an identity certificate request, each participant sends an identity certificate (e.g., encrypted using the participant's private key) to the BaaS server, and the BaaS server decrypts the identity certificate using the participant's public key.

Access privileges of respective participants are recorded (406). For example, for each participant, one or more service types are recorded in a service authorization table (data table) by the BaaS server. Continuing with the first, second, third participant example above, the service authorization table can record that the first participant is able to conduct secure transactions with the second participant, and the third participant, separately, that the second participant is able to conduct secure transactions with the first participant, and that the third participant is able to conduct secure transactions with the first participant.

A service key request is received (408). For example, to be able to conduct a secure transaction within the consortium blockchain network, a participant needs to first request an appropriate service key. For example, for the first participant to conduct secure transactions with the second participant (or the third participant), the first participant sends a respective service key request to the BaaS platform. It is determined whether the participant is authorized for the requested service key (410). For example, the BaaS server references the service authorization table to determine whether the participant that sent the request is authorized for the service. If the participant is not authorized for the requested service key, an error is sent (412).

If the participant is authorized for the requested service key, the service key is generated (414). For example, the BaaS server generates the service key (private-public key pair) using the KDF key tree. A key package is provided (416). For example, the BaaS server encrypts the private key of the service key using the participant's public key, and creates a service key package that includes the public key of the service key, and the encrypted private key. The service key package is sent to (418). The BaaS server sends the service key package to the participant. As described herein, the participant decrypts the encrypted private key of the service key using the participant's private key.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present specification have been described. Nevertheless, it will be understood that various modifications may be made without departing from the spirit and scope of the present specification. Accordingly, other implementations are within the scope of the following claims.

What is claimed is:

1. A computer-implemented method for management of service keys for consortium blockchain networks within a blockchain-as-a-service (BaaS) platform, the method comprising:
    receiving a request for a service key from a participant in a consortium blockchain network provisioned within the BaaS platform;
    determining that the participant is authorized for the service key based on a service authorization table that records participant privileges within the consortium blockchain network;
    providing a key package comprising an encrypted private key of the service key, and a public key of the service key; and
    sending the key package to the participant, the participant decrypting the private key of the service key using a key associated with the participant.

2. The method of claim 1, further comprising, prior to receiving the request for the service key from the participant, receiving an identity certificate from the participant.

3. The method of claim 2, wherein the identity certificate is received as an encrypted identity certificate, and the BaaS platform decrypts the identity certificate using a public key of the participant.

4. The method of claim 1, further comprising encrypting the private key of the service key using a public key associated with the participant.

5. The method of claim 1, wherein the service key is generated using a key derivation function (KDF) key tree in response to determining that the participant is authorized for the service key.

6. The method of claim 1, wherein the service key is absent from the BaaS platform after sending the key package to the participant.

7. The method of claim 1, wherein the participant uses the private key of the service key to encrypt transactions with one or more other participants within the consortium blockchain network.

8. A non-transitory, computer-readable medium storing one or more instructions executable by a computer system to perform operations for management of service keys for consortium blockchain networks within a blockchain-as-a-service (BaaS) platform, the operations comprising:
    receiving a request for a service key from a participant in a consortium blockchain network provisioned within the BaaS platform;
    determining that the participant is authorized for the service key based on a service authorization table that records participant privileges within the consortium blockchain network;
    providing a key package comprising an encrypted private key of the service key, and a public key of the service key; and
    sending the key package to the participant, the participant decrypting the private key of the service key using a key associated with the participant.

9. The non-transitory, computer-readable storage medium of claim 8, wherein operations further comprise, prior to receiving the request for the service key from the participant, receiving an identity certificate from the participant.

10. The non-transitory, computer-readable storage medium of claim 9, wherein the identity certificate is received as an encrypted identity certificate, and the BaaS platform decrypts the identity certificate using a public key of the participant.

11. The non-transitory, computer-readable storage medium of claim 8, wherein operations further comprise encrypting the private key of the service key using a public key associated with the participant.

12. The non-transitory, computer-readable storage medium of claim 8, wherein the service key is generated using a key derivation function (KDF) key tree in response to determining that the participant is authorized for the service key.

13. The non-transitory, computer-readable storage medium of claim 8, wherein the service key is absent from the BaaS platform after sending the key package to the participant.

14. The non-transitory, computer-readable storage medium of claim 8, wherein the participant uses the private key of the service key to encrypt transactions with one or more other participants within the consortium blockchain network.

15. A system for management of service keys for consortium blockchain networks within a blockchain-as-a-service (BaaS) platform, comprising:
    one or more computers; and
    one or more computer-readable memories coupled to the one or more computers and having instructions stored thereon which are executable by the one or more computers to:
        receive a request for a service key from a participant in a consortium blockchain network provisioned within the BaaS platform;
        determine that the participant is authorized for the service key based on a service authorization table that records participant privileges within the consortium blockchain network;

provide a key package comprising an encrypted private key of the service key, and a public key of the service key; and send the key package to the participant, the participant decrypting the private key of the service key using a key associated with the participant.

16. The system of claim 15, wherein the one or more computer-readable memories are configured with further instructions executable by the one or more computers to, prior to receiving the request for the service key from the participant, receive an identity certificate from the participant.

17. The system of claim 16, wherein the identity certificate is received as an encrypted identity certificate, and the BaaS platform decrypts the identity certificate using a public key of the participant.

18. The system of claim 15, wherein the one or more computer-readable memories are configured with further instructions executable by the one or more computers to encrypt the private key of the service key using a public key associated with the participant.

19. The system of claim 15, wherein the service key is generated using a key derivation function (KDF) key tree in response to determining that the participant is authorized for the service key.

20. The system of claim 15, wherein the service key is absent from the BaaS platform after sending the key package to the participant.

* * * * *